United States Patent [19]

Bernham et al.

[11] 4,214,655

[45] Jul. 29, 1980

[54] ARTICLE HANDLING APPARATUS ESPECIALLY USEFUL FOR HANDLING CONCRETE BLOCKS

[75] Inventors: Robert R. Bernham, Apache Junction; Harold Christy, Phoenix, both of Ariz.

[73] Assignee: George R. Cogar, Frankfort, N.Y.

[21] Appl. No.: 859,044

[22] Filed: Dec. 9, 1977

[51] Int. Cl.² ............................................. B65G 37/00
[52] U.S. Cl. .................................... 198/374; 198/403; 414/763; 414/771; 425/DIG. 117
[58] Field of Search .................... 214/1 Q, 1 QA, 6 A, 214/8.5 C, 309, 6 P, 6.5; 198/374, 403, 379, 402; 425/254, 413, DIG. 117, DIG. 118; 53/143, 161; 414/763, 771

[56] References Cited

U.S. PATENT DOCUMENTS

| | | | |
|---|---|---|---|
| 1,389,794 | 9/1921 | Thiele et al. | 214/6 P X |
| 3,245,557 | 4/1966 | Maramonte et al. | 214/6 P |
| 3,412,439 | 11/1968 | Baker | 425/DIG. 118 |
| 3,656,634 | 4/1972 | Pearne et al. | 214/8.5 C X |
| 3,826,382 | 7/1974 | Zappia | 53/161 X |
| 3,973,673 | 8/1976 | Ahluwalia | 198/403 X |
| 3,998,423 | 12/1976 | Mullins | 425/DIG. 118 |

FOREIGN PATENT DOCUMENTS 1062188 12/1953 France ................................. 198/379

Primary Examiner—L. J. Paperner
Attorney, Agent, or Firm—Harry M. Weiss

[57] ABSTRACT

This disclosure relates to an apparatus or machine which is especially useful in performing an important article handling function in a semi-automatic production arrangement for inverting and moving interlocking, epoxy bonded blocks. These blocks, commonly referred to as Super Blocks, are cast three at a time on a special steel pallet having accurately positioned cavities. During the casting process eight alignment pins or protrusions are formed on the bottom of each block while at the same time matching alignment dimples or depressions are formed on the top of each block. The semi-cured blocks are inverted by the disclosed apparatus to avoid damage to the alignment pins when the blocks are placed on an exit conveyor. The same block inversion or transfer operation conveniently strips the three blocks off of each of the steel pallets making them ready for the next casting cycle.

1 Claim, 9 Drawing Figures

ARTICLE HANDLING APPARATUS ESPECIALLY USEFUL FOR HANDLING CONCRETE BLOCKS

BACKGROUND OF THE INVENTION

1. Field of the Invention

This invention relates generally to article handling machines or apparatus, and more particularly, to article handling machines or apparatus especially useful in the production of interdigitated building blocks designed for use in a simple epoxy bonded construction process.

2. Description of the Prior Art

Cast, moulded or moulded and fired construction blocks as an alternative to natural or cut stone have been used for several thousand years. Materials used in block manufacture have ranged from sun-dried adobe to pressed glass. In recent years, sand-aggregate cement mixtures for production of concrete blocks have provided an alternative to kiln-fired clay bricks. Where abundantly available, cinders or fly ash have been used with cement mixtures in building block manufacture.

Prior art in this special branch of the materials or article handling field has been primarily concerned with automated methods of shaping, moving, stacking, and firing of clay bricks. Prior art in building construction systems also includes extruded and fired clay tiles as well as colored, textured and salt-glazed facing bricks. While some clay products technology has been transferred to the cement block or so-called slump block industry, these mainly larger and heavier construction shapes require more hand labor than the brick industry.

Accordingly, a need existed for a nearly fully automated operation for casting, curing, moving, and stacking interdigitated concrete building blocks. This disclosure describes such an operation and a machine which is used to perform an important function in this operation.

SUMMARY OF THE INVENTION

Accordingly, it is an object of this invention to provide an improved article handling apparatus.

It is another object of this invention to provide an improved article handling apparatus for handling blocks used for construction.

It is still another object of this invention to provide an improved article handling apparatus for lifting and inverting articles.

It is still a further object of this invention to provide a machine with the capability of lifting 8"×8"×16", 35 pound concrete building blocks in lots of three from the steel pallet upon which they were cast and depositing the inverted blocks on a system output conveyor.

It is still another object of this invention to provide an apparatus for horizontal transfer of concrete or slump building blocks in lots of three or more from a plain pallet to a system exit conveyor.

It is a further object of this invention to provide an article handling machine or apparatus which can be easily adapted to accommodate, lift or move various sizes of building blocks other than 8"×8"×16".

It is still a further object of this invention to provide an article handling apparatus which has a means of changing the machine platform height to adapt it for use with various conveyor system heights.

A further object of this invention is to provide an article handling apparatus which includes fail safe apparatus shut down features in the event of loss of power or pressure.

The foregoing, and other objects, features, and advantages of the invention will be apparent from the following, more particular description of the preferred embodiment of the invention as illustrated in the accompanying drawing.

BRIEF DESCRIPTION OF THE DRAWING

Referring to FIG. 1, a construction block inverter-transfer machine or apparatus 20 is shown in its relation to an incoming chain link conveyor 18, which is hydraulically powered, and an exit conveyor 22 which preferably uses a rubberized fabric belt and is powered with an electric motor. A double pivoted, hydraulically powered block transfer arm 24 is shown in the vertical or home position. The brick transfer arm 24 returns to its home or vertical position after completion of each block transfer cycle where it remains until the arrival of a block-laden pallet initiates another block transfer cycle.

Figure 1:
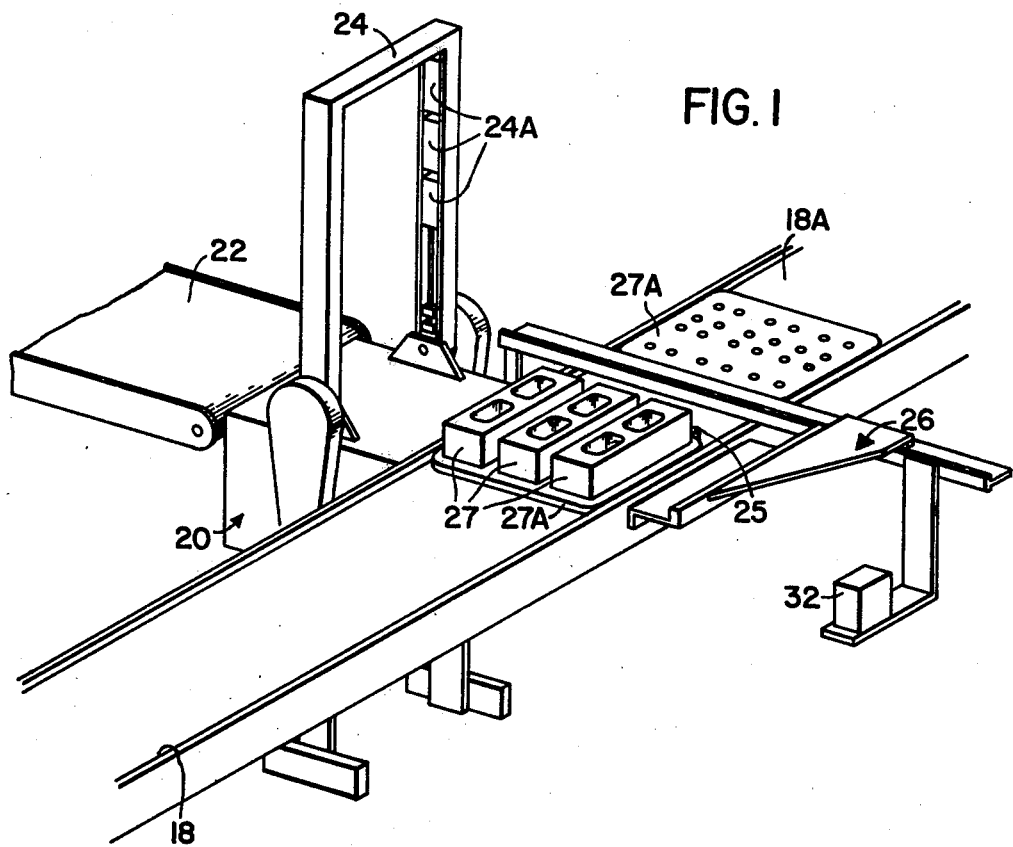
FIG. 1 is a perspective view of the block inverter-transfer machine or apparatus of this invention.

A pallet positioning mechanism (not completely shown) is installed under the chain link incoming conveyor 18 and is a part of the block transfer machine 20. The pallet positioner consists of an air pressure cylinder actuator (not shown) which simply rotates a shaft on which are installed two pins or lugs 25 (only one of which is shown in FIG. 1). The pins 25 are positioned on a line on opposite sides of the conveyor belt 18. Thus, when photoelectric detector 32 (see FIG. 1) indicates that a pallet 27A with three blocks 27 is opposite the block transfer machine 20, the incoming conveyor drive belt 18 is shut off and the pneumatic cylinder actuator of the pallet positioner rotates the lugs 25 to the "up" position which captures the pallet 27A and prevents conveyor inertia from having the pallet 27A overshoot the desired position. The lugs 25 also function to push the pallet 27A backward to an accurately adjusted location so that the block transfer arm 24 can pivot to a horizontal position over the blocks 27 to pick up the blocks 27 without interference. The backward adjustment of the pallet 27A because of the actuation by the lugs 25 is achieved by a bell crank or pivoting action between the lugs 25 and the pneumatic actuator.

Reference numeral 26 in FIG. 1 shows the monorail, chain driven, horizontal, push across arm or device which can be used as an alternate method of clearing pallets which carry non-interdigitated 8"×8"×16" blocks or non-interdigitated blocks or objects of other sizes and shapes. The push across device 26 is described below with reference to FIGS. 4A and 4B.

Figure 2:
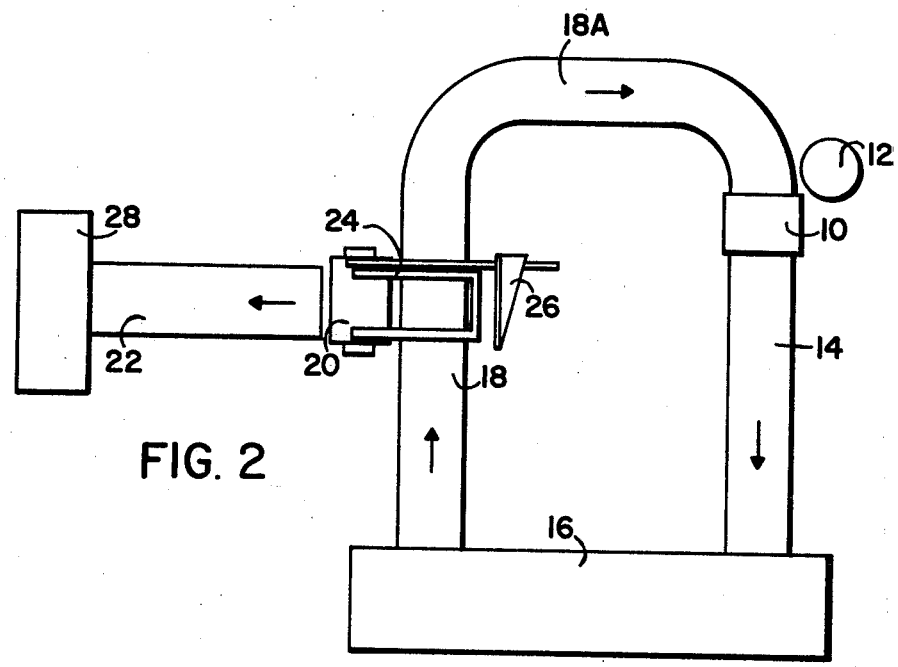
FIG. 2 is a plan view identifying the location of the block inverter-transfer machine or apparatus of FIG. 1 within the overall flow pattern of an automated block manufacturing, curing, and handling operation.

Referring to FIG. 2, a flow plan of a semi-automated block manufacturing facility is shown. The block inverter-transfer machine 20 with its transfer arm 24 is shown as it would be used as part of the total semi-automated block manufacturing facility.

The block casting machine is shown by reference numeral 10 and an aggregate cement silo 12 is located adjacent to the casting machine 10. As is well known, success in high speed casting of cement blocks requires careful control of aggregate size, exact cement mixture and water content which will allow the mixture to flow into the moulds, but will not allow the freshly cast blocks to slump excessively when the moulds are withdrawn. The stainless steel moulds that are used in the block casting operation have an internal insert with a considerable taper. External dimensions of the mould are ⅛ inch undersize with features designed to permit easy withdrawal after the mould contents are consolidated by vibrating the steel pallet on which the moulds are placed.

Blocks can be cast by the casting machine 10 at a maximum rate of one pallet (holding three cast blocks) at eight second intervals. With an average casting rate of one pallet filled each ten seconds or six pallets per minute, 360 pallets per hour, the total pallet requirement for 10 hours of daily operation would be about 3600 (holding 10,800 cast blocks). Thus, with this high volume of pallets and cast blocks, it is critical to the production cycle to have a block transfer apparatus as described herein that can remove blocks faster than the casting rate.

The freshly cast blocks on the steel pallets 27A come from the casting machine 10 on a chain link conveyor 14 and are loaded onto seasoning racks located in a seasoning shed 16 which should have a storage capacity for about 4000 pallets.

After a seasoning period of 24 hours, the pallets 27A are placed on the chain link incoming conveyor 18 on a first in first out basis from the seasoning shed 16. As each pallet 27A comes opposite the inverter-transfer machine 20, the three blocks 27 are either lifted off by the transfer arm 24 and placed on the exit conveyor 22, or, if ordinary (not interdigitated) blocks are being processed, pushed across by the monorail (traveling) arm 26.

Exit conveyor 22 terminates at a "crosshatch" stacking station 28 where the Super Blocks are stacked by hand in 6'×6'×6' piles on wooden pallets and hauled away for further seasoning and storage prior to sale. Ordinary blocks are stacked in any convenient stacking configuration based on their shape and size.

After passing the transfer station 20, the incoming conveyor 18 becomes incoming conveyor 18A which contains only empty pallets (see FIG. 1) which are returned to the block casting machine 10 for re-use, in a complete cycle of operation. The empty pallets 27A can be cleaned off, if desired, by a brush prior to re-use. If the lift-off or transfer rate of the blocks 27 to the exit conveyor 22 should temporarily exceed the block casting rate, stacking of the empty steel pallets 27A is done prior to their arrival at the casting machine 10.

Figure 3A:
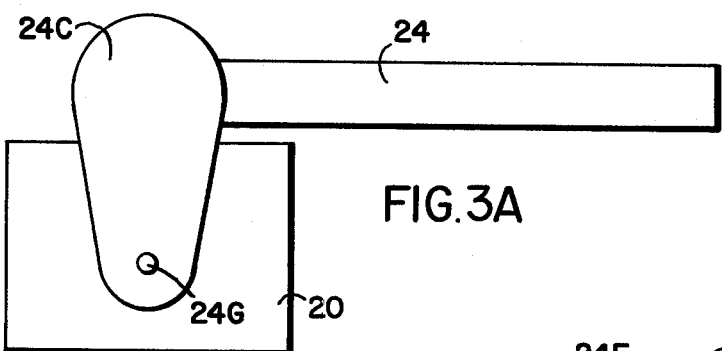
FIG. 3A is a side elevational view of the lifting and inverting arm drive mechanism used in the apparatus of FIG. 1.
Figure 3B:
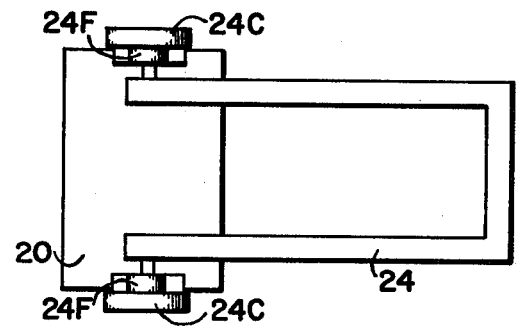
FIG. 3B is a top view of the lifting arm drive mechanism of FIG. 3A.
Figure 3C:
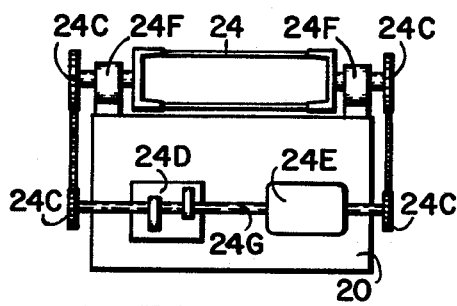
FIG. 3C is an end elevational view showing the hydraulic actuator unit and drive mechanism for the inverter-transfer arm unit of FIGS. 3A and 3B.

FIGS. 3A, 3B and 3C show a side view, top view and front view, respectively, of the block transfer machine 20. The transfer arm 24 is preferably driven by a Hydroact vane-type rotary actuator 24E (see FIG. 3C) with a total angle of rotation of 280 degrees. This is reduced to a travel angle of 180 degrees by a chain and sprocket combination 24C (see FIGS. 3A, 3B and 3C) installed on each side of the transfer arm 24. Two ball bearing pillow blocks 24F located between the transfer arm 24 and the chain and sprocket 24C furnish a stable pivot for the transfer arm 24. The hydraulic actuator 24E is mounted on a cross shaft 24G (see FIG. 3C). This shaft 24G also supports sequence cams 24D which operate micro switches for functional control of the transfer arm 24 in accordance with the logic diagram of FIG. 5.

With the hydraulic actuator unit 24E (of FIG. 3C) which drives the transfer arm 24 set for maximum fluid through-put, a block transfer cycle can be completed in three seconds. With the control valve of the hydraulic actuator 24E adjusted to pass 2.2 gallons per minute (GPM) at a hydraulic pressure of 650 pounds per square inch (PSI), a transfer cycle of the transfer arm 24 from its vertical position, to pick up of blocks, to delivery of blocks and to return to its vertical position will be completed at eight second intervals, which is slightly faster than the average production rate of the block casting machine.

Figure 3D:
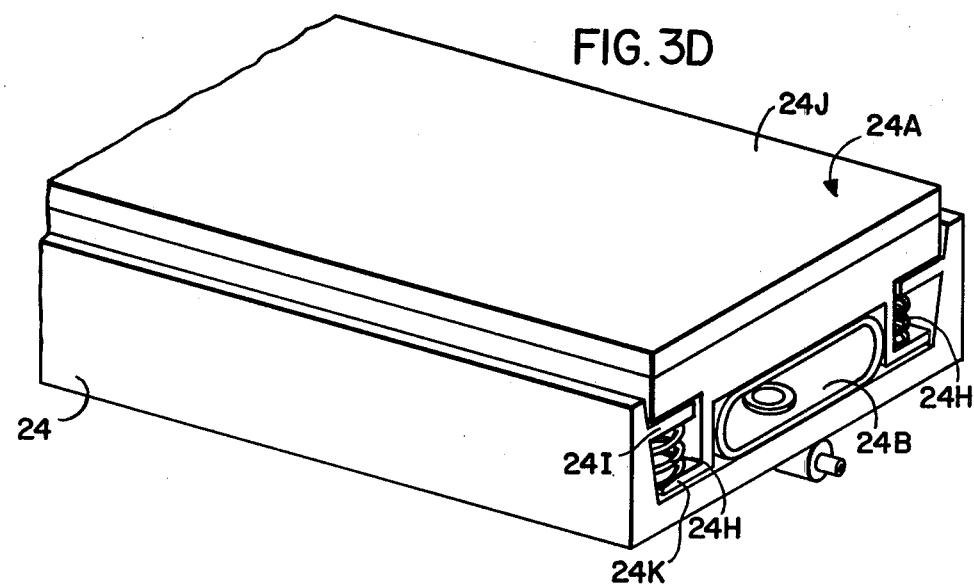
FIG. 3D is a perspective view with a portion broken away to show the interior of the inverter arm of the apparatus of FIG. 1.

FIG. 3D shows details of the pneumatically actuated block gripping system. Three steel shoes 24A (only one of which is shown in FIG. 3D) are fitted into recesses in each side of the transfer arm 24 as shown in FIG. 1. The steel shoes 24A are held captive in the transfer arm 24 by cleats or cross-brackets 24I. An air-tight rubberized nylon tube 24B which is forced into an oval shape by captive return springs 24H located on each end of the gripping shoes is installed within each side of the transfer arm 24 behind the gripping shoes 24A (see FIG. 3D). When air is supplied to the oval rubberized nylon pressure tube or hose 24B, it assumes a round shape, if not restrained, and thus forces the gripping shoes 24A to move forward up to ⅜ inches to the cleats or cross-bracket stops 24I (in the absence of a block) that would be gripped against the tension of the return springs 24H. The steel gripping shoes 24A are preferably faced with ½ inch thick blocks or plates 24J of phenolic fabric material which serves as conforming friction pads for grabbing the concrete blocks 27 along their short axis. Because the same air pressure is supplied to each side of the transfer arm 24, the blocks 27 will be centered within the arm 24 when picked up. Inasmuch as it takes about 10 PSI to move the pickup shoes 24A in order to override the return springs 24H, the gripping pressure at the pickup point where the block transfer machine 20 is located will be consistant and an unobstructed no drag release will be obtained because of the resilient action of the springs 24H when air is bled from the pressure bags or tube 24B. In the event one or two of the three blocks are missing, the gripping shoes 24A will move forward and its stop 24K will move against the stops or cleats 24I without interference, to pickup the balance of the block load. If a block is broken or grossly distorted, the gripping shoes 24A will not be able to grip it because of its noncomforming size and it will remain on the pallet 27A. However, the gripping system of the transfer arm 24 can accommodate block dimensional variations of ¼ inch and slight variations in horizontal and vertical block angles. By installing one inch spacers between the underlying steel portion of the shoes 24A and the ⅛ inch phenolic fabric gripping pads or blocks 24J, 14 inch conventional slump blocks can be handled or gripped by the transfer arm 24. If half blocks rather than full blocks are to be inverted and transferred, wooden or steel spacers of correct thickness should be inserted by hand between each pair of half blocks to provide a rigid support for pickup.

Figure 4A:
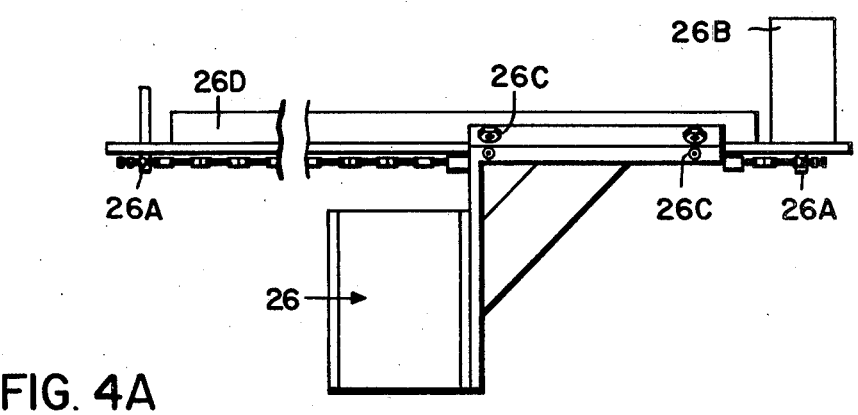
FIG. 4A shows a top view of the horizontal block transfer mechanism used in the apparatus of FIG. 1.
Figure 4B:
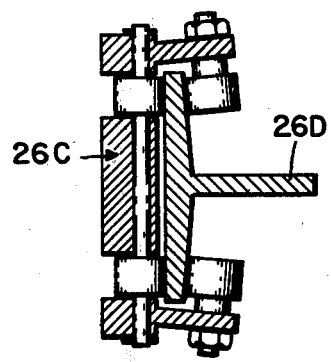
FIG. 4B shows the double roller arrangement used to support and guide the horizontal transfer mechanism of FIGS. 1 and 4A on its T-beam rail.

FIG. 4A shows a top view of the monorail guided, block shifting dolly or push across device 26 which is driven by a double sprocket and chain arrangement 26A. The outboard sprocket is driven by a bidirectional hydraulic motor 26B. The monorail which supports the block shifting dolly 26 is preferably a steel "T" beam 26D. Details of dolly roller mechanism 26C is shown in FIG. 4B (see also FIG. 4A). Two roller mechanisms 26C are used to support and guide the block shifting dolly 26 as shown at 26C (see FIG. 4A). Thus, the "T" beam monorail 26D is stationary and the push across dolly 26 is moved due to the rolling action of the four rollers (see FIG. 4B) on the shown portions of the "T" beam 26D.

Figure 5:
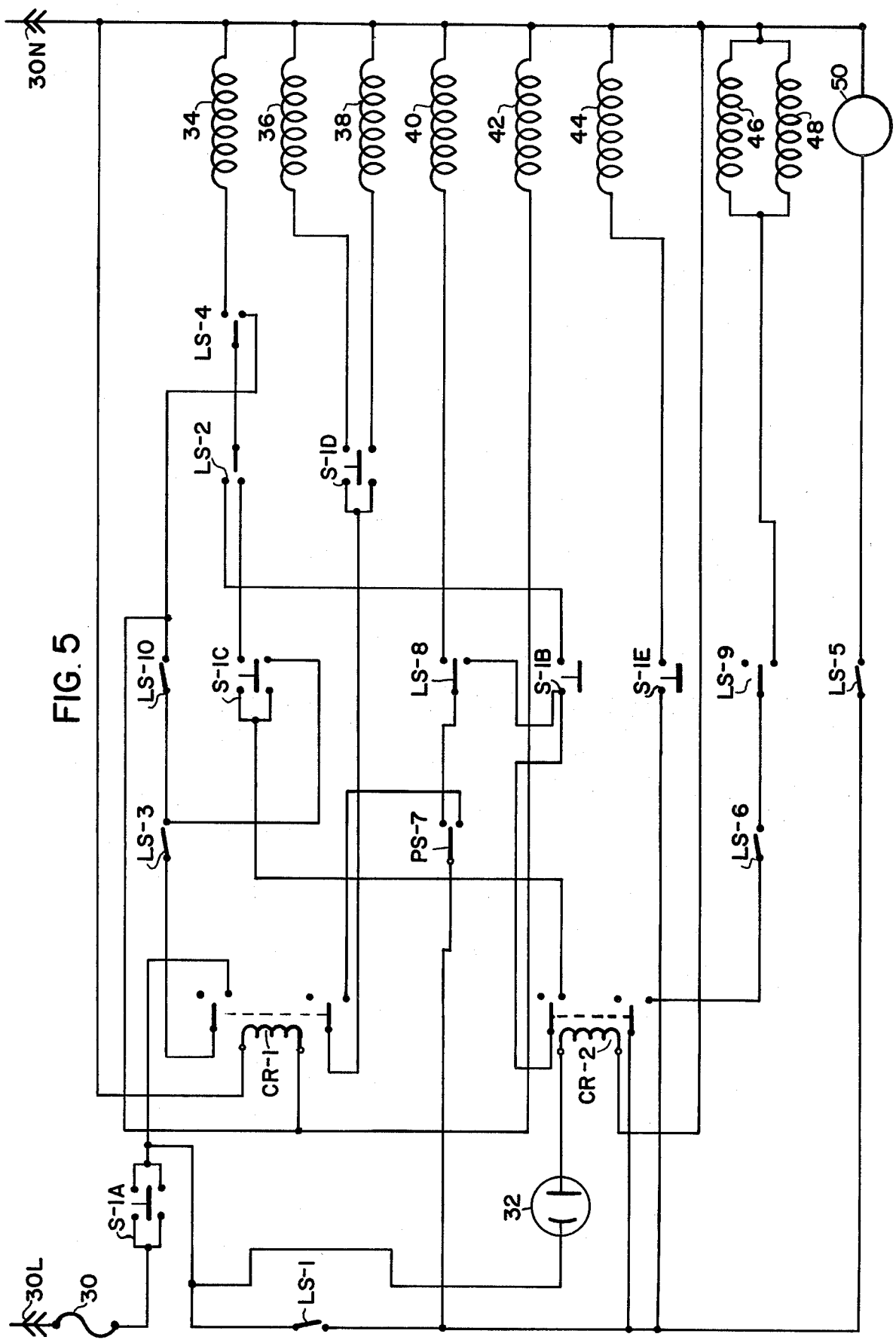
FIG. 5 is an electrical schematic diagram showing the control and switching logid of the block inverter-transfer machine or apparatus of FIG. 1.

FIG. 5 is an electrical schematic diagram showing the control and switching logic of the block inverter-transfer machine 20 showing the manual controls, photoelectric control, switching logic and safety features. Switch S-1A through S-1E is a five pole, three-way manual selector switch. In the up position of the switch S-1A through S-1E, the block transfer-inverter machine 20 is switched on to function in the block inverter or turn-over mode. In the center position, the machine 20 is completely off. The down switch position turns the machine 20 on to function in the block shifter or push across mode using the push across device 26.

Machine control functions are accomplished preferably with eight solenoid operated control valves, 34, 36, 38, 40, 42, 44, 46 and 48, two relays CR-1 and CR-2, and a photoelectric cell 32 which are all powered with 115 Volts AC. The line side of the power input is connected to the control system of the machine 20 at line bus terminal 30L, and to the neutral side of the power input at neutral bus terminal 30N. A 15 amp fuse is installed in the line bus circuit at 30. One terminal of the solenoids 34, 36, 38, 40, 42, 44, 46 and 48 is connected to the neutral bus 30N as is the neutral terminal of the exit conveyor motor 50.

An important safety feature of this control system is switch LS-1 which performs a momentary interrupt function and stops all machine motion, including both conveyors 18 and 22 but does not relieve the air pressure on the block holding shoes 24A in case the transfer arm 24 is in the process of lifting a load of blocks.

Another safety feature is provided by contacts shown at S-1E on the control switch (S-1A through S-1E) which are closed when the machine 20 is operating in the block inverter mode. Switch contacts S-1E energize solenoid 44 which is a spring-loaded air valve installed in the air outlet line which normally releases the pressure applied to the rubberized nylon tubes 24B of the block holding shoes 24A in the transfer arm 24. However, if the power fails or if the switch (S-1A through S-1E) is inadvertently shut off during block lift-over, the solenoid valve 44 closes and holds air in the tubes 24B of the transfer arm 24 thus preventing block droppage.

Switches LS-2, LS-3, LS-4, LS-5 and LS-6 are actuated by the sequence cams 24D mounted on the hydraulic rotary actuator shaft 24G (see FIG. 3C). Switch LS-10 is operated by the block shifting dolly 26 at the inboard end of its travel and switches LS-8 and LS-9 are operated at the outboard end (as shown in FIG. 1) of the block shifting dolly 26. Switch PS-7 is operated by air pressure in the line which actuates the rubberized nylon tubes 24B which operate the block holding shoes 24A as described above. When the block inverter arm 24 delivers its blocks to the exit conveyor 22, switch PS-7 delays reversal of the hydraulic actuator 24E until air pressure in the block holding shoe line or tubes 24B is about four PSI. This assures that blocks are fully released before the transfer arm 24 returns to the vertical or home position. Switch PS-7 also delays pickup of a load of blocks at the start of the block transfer operation (from input conveyor 18) until pressure in the holding shoe line or tubes 24B is at least 25 PSI, thus assuring a firm grip.

A BRIEF SUMMARY OF THE BLOCK INVERTER-TRANSFER MACHINE OPERATION

To initiate a cycle of operation in the block inverter-transfer machine 20, control switch S-1 (switches S-1A through S-1E) must be in the up position closing the upper contacts. Photoelectric cell 32 will be in a low resistance or conductive state because of received ambient reflected light from a carefully positioned flyseye mirror unit (not shown). Conduction in the photocell 32 energizes relay CR-2, causing the upper and lower contacts of the relay CR-2 to close and simultaneously energize both the hydraulic solenoid 46, which makes the chain link input conveyor 18 operational, and solenoid 48, which operates the air valve that withholds air from the pneumatic pallet arrestor cylinder which drives the pins 25 (see FIG. 1). Switches LS-6 and LS-9 are in series with the parallel connected control solenoids 46 and 48, but switch LS-6 is closed when the transfer arm 24 is in the vertical or home position and switch LS-9 is closed when the monorail brick pusher dolly 26 is in the outboard position. Thus, the input conveyor 18 is operational and the pallet positioner pins 25 are retracted out of possible contact with the pallets.

The top contacts on the control relay CR-2 when closed energize the control relay CR-1 as follows: From the AC line side 30L through selector switch S-1A, through LS-1 which is normally closed, through the low pressure (top) contact of pressure switch PS-7, and through the normally closed contacts of the block pusher return switch LS-8 to the upper moveable contact of CR-2. The stationary contact of the control relay CR-2 is connected to one coil terminal of the control relay CR-1 via control selector switch S-1D, the lower contact of transfer arm home control switch LS-2 and the lower contact of block clamp switch LS-4. The other coil terminal of the control relay CR-1 is connected directly to the AC neutral bus 30N. It will be noted that the control relay CR-1 does not drop out when the control relay CR-2 is de-energized. This is due to the upper contacts on the control relay CR-1 which keep this relay energized until either LS-3, the block release switch, or LS-10, the push dolly direction control switch, is opened up. The upper contacts of the control relay CR-1 also energize the solenoid 42 via the control switches LS-3 and LS-10. The movable arm of the lower contact of the control relay CR-1 is connected to the AC neutral bus 30N via the control selector switch contacts S-1D (upper contacts closed) and the block transfer arm control solenoid 36. The lower stationary contact of the control relay CR-1 is connected to the AC line 30L via the high pressure (lower) contacts of the pressure switch PS-7.

When the chain link input conveyor 18 brings a pallet 27A with blocks 27 opposite the inverter-transfer machine 20 (FIGS. 1 and 2), ambient light reflected into the photoelectric cell 32 from the flyseye mirror (not shown) is obscured. This causes the control relay CR-2 to drop out and interrupt power to the solenoids 46 and 48. This stops the input conveyor 18 and the lugs 25 controlled by the block arrestor cylinder now are actuated to stop the pallet 27A and position it for block pickup by the transfer arm 24 (see FIG. 1). Drop-out of the control relay CR-2 also moves the transfer arm 24 from the vertical or home position to a horizontal position ready for block pickup. This is achieved by interrupting power to the solenoid 34 (connected via contacts on switches S-1B, LS-2 and LS-4). When the transfer arm 24 is at 45 degrees from the home or vertical position moving downwardly in the horizontal block pickup direction, switch LS-6 is opened up by one of the five sequencing cams 24D located on the actuator cross shaft 24G, thus preventing any possibility of the block input conveyor 18 restarting until after the transfer arm 24 passes the same 45 degree position going in the upward or block lifting direction. When the laden block transfer arm 24 reaches 45 degrees past the vertical in the downward direction towards the output conveyor 22 another cam of the sequencing cams 24D on the cross shaft 24G opens up the switch LS-5 which stops the exit conveyor motor 50, thus stopping the output conveyor 22. The exit conveyor motor 50 restarts when the transfer arm 24 passes the 45 degree position going in the opposite or upward direction after leaving the blocks 27 on the output conveyor 22. When the transfer arm 24 straddles a pallet load of blocks on the input conveyor 18, still another cam of the sequencing cams 24D moves the control switch LS-4 into the down position, energizing the 3-way air valve solenoid 42 which operates to supply air to the rubberized nylon tubes 24B, which drive the pickup shoe 24A in the transfer arm 24. When the air pressure within the tubes 24B reaches 25 PSI, pressure switch PS-7 closes the high pressure contacts (in its downward position) and energizes solenoid 36 through the lower closed contacts on the control relay CR-1 and the upper closed contacts in the switch S-1D. This starts the transfer arm 24 on a lift over cycle with switching functions at 45 and 135 degrees as previously mentioned.

As soon as the transfer arm 24 lifts a load of blocks 27 off a pallet 27A, the shadow is removed from the photoelectric cell 32 which causes it to go into conduction and re-energize the control relay CR-2. When the transfer arm 24 reaches its travel limit down over the exit conveyor 22, the control switch LS-3 is opened up by one of the five sequencing cams 24D which de-energizes the air control solenoid 42 and the control relay CR-1. When air pressure in the shoe driving tubes 24B in the transfer arm 24 drops to 4 PSI, pressure switch PS-7 returns to its low pressure contacts (upper contact) and re-energizes the solenoid 34 via the lower contacts on switch LS-8, selector switch S-1B and the control switches LS-2 and LS-4. Operation of the solenoid 34 starts the transfer arm 24 on its return journey to the block pickup point over the input conveyor 18. If in the meantime a pallet with blocks has been stopped at this pickup point, the transfer arm 24 moves to its horizontal pickup position and the block inversion cycle repeats as previously described. If no pallet with blocks is detected, the transfer arm 24 stops in the home or vertical position to await arrival of blocks.

A BRIEF DESCRIPTION OF BLOCK PUSH ACROSS OPERATION

When the machine selector switch S-1 (S-1A through S-1E) is manually placed in the down position, the block inverter-transfer machine 24 is set to operate in the push across mode. No further adjustment is required except the manual positioning of a metal bar (not shown) across the downstream end of the input conveyor 18.

As previously mentioned, the block shifting dolly 26 is normally in the outboard or home position thus holding the control switch LS-8 on its lower contact and the switch LS-9 closed. In the absence of a shadow from a pallet loaded with blocks, the photoelectric cell 32 is in the conductive state which energizes the control relay CR-2. One set of contacts on the control relay CR-2 energizes the solenoids 46 and 48 via switches LS-6 and LS-9 (both closed). The block conveyor 18 is operational and the pallet arrestor cylinder which actuates the pins 25 places the pins 25 in its down position ready to come up to stop a pallet. The upper set of contacts on the relay CR-2 energizes the control relay CR-1 via the lower selector switch contacts S-1C and the switch LS-10. The movable contact of the relay CR-2 receives line power from the lower contact of the limit switch LS-8 and the upper contact of the switch PS-7. The relay CR-1 is locked on or up through the switch LS-3 and the upper contacts of CR-1.

When the shadow of a block cuts off the photoelectric cell 32 and the relay CR-2 drops out, the block input conveyor 18 stops and the pallet arrestor pins 25 are actuated upwardly thereby stopping the pallet on the conveyor 18. There is no assurance that the non-interdigitated blocks will come from the curing shed in an optimum position to be acted on by the block shifting dolly 26 because the blocks are not keyed to smooth or plain (or undimpled) pallets. Thus, provision is made for use of a fixed cross-bar to stop the randomly positioned blocks on each pallet at the correct or desired location in addition to the pallet stopping pins or device 25 shown in FIG. 1. The central platform of the inverter-transfer machine 20 (see FIG. 1) located between the output conveyor 22 and the input conveyor 18 is fitted with tapered side plates mounted on the platform which further guides movement of the blocks in the push-across mode.

The control switch LS-5 which shuts off the exit conveyor motor 50 is actuated by one of the sequencing cams on the cross shaft 24G that drives the transfer arm 24 used in the block inverter mode at a point 45 degrees from the vertical or home position when the transfer arm 24 is moving toward the exit conveyor 22. Thus, when the block transfer machine 20 is operated in the push-across mode, the transfer arm 24 is in the vertical or home position and the exit conveyor motor 50 runs continuously thereby causing the exit conveyor 22 to run continuously.

When a pallet with blocks is stopped at the push-across location, the solenoid 38 is energized through the lower contact of PS-7, the lower contact on the relay CR-1 and the lower contacts on the switch S-1D. This starts the hydraulic motor 26B and pushes the blocks out onto the exit conveyor 22 because of the pushing action of the push-across mechanism 26 which conveyor, as mentioned previously, is not stopped for this mode of operation.

When the block shifting dolly 26 leaves the outboard or home position, the control switch LS-9 opens up and prevents restarting of the block input conveyor 18 until the dolly 26 again returns to its home position. When the block shifting dolly 26 reaches its inboard limit of travel, the solenoid 38 is energized via the lower contact of the switch PS-7 and the limit switch LS-10 which de-energizes the control relay CR-1 and reverses the hydraulic motor 26B which returns the block shifting dolly 26 to its home or outboard position.

In the meantime, ambient light has again made the photocell 32 conductive, re-energized CR-2, and, when the block shifting dolly 26 has closed the control switch LS-9, the block conveyor 18 is restarted and the pallet pin positioner pneumatic cylinder is reset, rendering the system ready for the arrival of another pallet of blocks.

While the invention has been particularly shown and described in reference to the preferred embodiment thereof, it will be understood by those skilled in the art that changes in the form and details may be made therein without departing from the spirit and scope of the invention. For example, the machine features ways in which there is assurance that the machine will fail-safe in case of interruption of the electrical input or hydraulic pressure. Loss of air pressure is not a critical factor because the transfer arm 24 will discharge its load before the pressure drops below 10 PSI.

What is claimed is:

1. A concrete block inverting machine comprising, in combination, means for stopping and positioning blocks of concrete that are moving on a conveyor, said block inverting means cooperatively associated with said stopping and positioning means for removing multiple blocks at one time from said conveyor and placing said removed blocks down in an inverted position, said block inverting means comprising a block transfer arm located on one side of said conveyor, and gripping means located within said block transfrer arm for gripping said blocks of concrete, said gripping means comprising a pair of gripping shoes, and pneumatic pressure tube means for moving each of said gripping shoes into gripping contact with said blocks of concrete said block inventing means further comprising block pushing means located on the opposite side of said conveyor from said block transfer arm for alternatively pushing said blocks off of said conveyor instead of inverting said blocks.

* * * * *